United States Patent Office 3,219,407
Patented Nov. 23, 1965

3,219,407
VINYL PHOSPHONIC ACID POLYMERS AND DERIVATIVES THEREOF AS ACIDIC CATALYSTS IN A PROCESS OF CREASEPROOFING CELLULOSE TEXTILES
Hans Sommer, Hofheim, Taunus, Fritz Linke and Fritz Rochlitz, Frankfurt am Main, and Herbert Vilcsek, Hofheim, Taunus, Germany, assignors to Farbwerke Hoechst Aktiengesellschaft vormals Meister Lucius & Brüning, Frankfurt am Main, Germany, a corporation of Germany
No Drawing. Filed May 31, 1961, Ser. No. 113,662
Claims priority, application Germany, June 1, 1960, F 31,345
7 Claims. (Cl. 8—116.3)

In order to impart to textile material, in particular cellulosic material, a good wearing resistance and particularly a good crease recovering capacity whether dry or wet, it is customary for the textile industry uses products that are capable of further condensation or that can be further hardened by the addition of an acid or of an acid-yielding substance and thereby partially react with the fiber. As such compounds of precondensation products, there are mentioned by way of example: the reaction products of urea or melamine with formladehyde and the ethers thereof; further, the reaction products of heterocyclic compounds, for example, ethylene urea or triazinone, with formaldehyde, and the ethers thereof; further, epoxide-containing compounds, for example, the reaction products of epichlorhydrin with polyalcohols such as glycol, glycerin, pentaerythrite; further, compounds that contain several ethylene imine groupings, for example, trisaziridinyl phosphine oxide. Also polyaldehydes and polyacetals have been used for the finishing of textiles. As acids or as acid-yielding substances, there have been used in these processes lower aliphatic carboxylic acids such, for example, as formic acid, acetic acid, lactic acid, oxalic acid, and similar acids, or the salts thereof, as well as salts that yield an acid at elevated temperature only, for example, ammonium chloride, ammonium nitrate, diammonium phosphate, or Lewis acids of the type of the zinc fluorborate.

The improvement of the crease recovering capacity and the resistance to shrinking of cellulose or of cellulosic fabrics finished by such treatments is good to excellent, depending on the substance and acid-yielding substances used. These treatments entail, however, the disadvantage that the resistance of the fabric treated, above all the resistance to tearing and abrasion, is considerably reduced.

Now, we have found that the crease-recovering capacity and the fastness to shrinking can be greatly improved, while largely avoiding loss in strength of the cellulose or of the cellulosic textile material, when using for the finishing, together with known acid-hardenable compounds or precondensates, polyvinyl phosphonic acids and/or salts and/or derivatives thereof instead of the known acids or acid-yielding products hitherto used. Copolymers of the vinyl phosphonic acid with other polymerizable monomers can also be used with a similar, good result.

Polyvinyl phosphonic acid and/or the salts or the derivatives thereof can be prepared, for example, according to the process described in German specification No. 1,106,963, i.e. by the polymerization of vinyl phosphonic acid and/or its salts with the use of radical formers, catalysts, and/or with exposure to ultraviolet radiation and/or with heating. Polymers that have about 50–100, preferably 65–85, molecular units per macromolecule are suitable in the process of this invention.

As salts of polyvinyl phosphonic acid, alkali metal salts, alkaline earth metal salts, amino salts, and ammonium salts, for example, the sodium salt, the potassium salt, the calcium salt, the zinc salt, or the ammonium salt, as well as the ethanolamine salts thereof are suitable. As derivatives of the polyvinyl phosphonic acid, the monoesters and the monoamides of polyvinyl phosphonic acids, and the corresponding salts thereof are suitable. Diesters and diamides may also be used. The quantity of polyvinyl phosphonic acid or of the salt or of the derivative or of the copolymer may amount to 1–50% of the substance to be catalyzed and depends on the type of acid-hardenable compound used and on the condensation temperature, which should generally be in the range of 90 and 160° C. If higher temperatures are applied, a smaller quantity of catalyst may usually be sufficient, but, on the other hand, it must be taken into consideration that the quantity of catalyst also depends on the ease with which the cleavage yielding the acid takes place.

The concurrent use of certain quantities of known acids or of acid-yielding substances together with the polyvinyl phosphonic acids or salts and/or derivatives thereof is not excluded; the fastness values, however, are thereby decreased. Further, there may also be simultaneously used in the above process, which is carried out in a manner as such known, the additives commonly used in such finishing compositions, for example, softeners, hydrophobizing agents, fungicidal or bactericidal substances as well as extenders and stiffening agents.

The process of the present invention may be applied to textile material from natural or regenerated cellulose or to cellulose-containing material, the cellulosic textiles ordinarily containing at least about 30% of cellulose.

The following examples illustrate the invention but they are not intended to limit it thereto. The parts are in weight unless otherwise stated.

*Example 1*

A staple fiber fabric is padded with a liquor containing per liter 100 g. of a precondensate of 1 mole of melamine and 3 moles of formaldehyde and 10 g. of a copolymer from 40 parts of vinyl acetate and 60 parts of vinyl phosphonic acid, the liquor having been neutralized with ammonia; the fabric is then predried at 80° C. and heated for 5 minutes to 130° C. The fabric so finished exhibits a good crease recovery while its resistance to tearing is only slightly reduced. A fabric which is finished in the same manner, but in using as catalyst 10 g./l. of ammonium glycolate instead of the copolymer from vinylacetate and vinyl phosphonic acid, exhibits the same crease recovery whereas its resistance to tearing is more reduced.

*Example 2*

A mercerized cotton poplin shirting is padded with a liquor containing per litre 75 g. of a reaction product of 1 mole of urea and 1.6 moles of formaldehyde, and 6 g. of ammonium nitrate; the fabric is then predried at 80° C. and heated for 5 minutes to 150° C. A similar fabric is treated in a parallel experiment in the same manner with the same quantity of urea-formaldehyde precondensate, but with 10 g./l. of a copolymer from 90 parts of vinylacetate and 10 parts of vinyl phosphonic acid monoethyl ester, in the form of the ammonium salt as acid donor instead of ammonium nitrate. In the case of the finish with ammonium nitrate the crease recovering capacity of the fabric in dry state amounts to 249°, as the sum of weft and warp, while the abrasion resistance is 220, whereas in the case of the finish with the vinylacetate/vinyl phosphonic acid-monoethyl ester copolymer, it amounts to 240° and the abrasion resistance is 544.

*Example 3*

A cotton shirting poplin is padded with an aqueous liquor containing per litre 180 g. of a 50% solution of one part of urea-dimethylol-dibutyl ether and one part of melamine-hexamethylol-pentabutyl ether, and 20 g. of magnesium chloride; the fabric is then shortly pre-dried and heated for some minutes at 145° C. A fabric intended for comparison is treated under the same conditions with the same product, but in using as acid donor 6 g./l. of a 83% aqueous solution of polyvinyl phosphonic acid neutralized with ammonia. The crease recovering capacity of the two fabrics is similarly good, but the tear strength of the fabric treated with magnesium chloride is reduced by 45%, whereas the tear strength of the fabric treated with polyvinyl phosphonic acid is reduced by only 20%.

*Example 4*

A cotton shirting poplin is treated with a liquor of the following composition:

150 g./l. of a 50% solution of the reaction product of glycerin with about 2 moles of epichlorhydrin,
150 g./l. of a 5% solution of polyvinyl alcohol having a K-value of 40,
15 g./l. of a 40% solution of zinc fluoroborate.

The fabric is then predried at 70° C. and heated for 10 minutes at 150° C. There is obtained a good wet crease angle, the tear strength being reduced in the weft by 25%.

When in the above solution the zinc-fluoroborate is replaced by 6 g./l. of the ammoniacal solution of the copolymer from 60 parts of vinyl phosphonic acid and 40 parts of acrylic acid, and the treatment is carried out as described above, the tearing strength in the weft, at the same wet crease angles, is reduced by only 15%.

*Example 5*

A light fabric from viscose staple fibers is padded with an impregnation liquor prepared from 150 g./l. of trisaziridinyl phosphine oxide and
5 g./l. of a copolymer from 4 parts of acrylic acid and 6 parts of vinyl phosphonic acid, adjusted to a pH of 7.2 by means of ammonia, squeezed to a residual humidity of about 80%, predried at 60° C. and heated for 5 minutes at 150° C. There is obtained a wet crease angle of 277° (sum of weft and warp), the tear strength in dry and in wet state remaining the same. When a similar fabric is treated with a liquor containing 15 g./l. of a 40% solution of zinc fluoroborate instead of the copolymer from acrylic acid and vinyl phosphonic acid, the wet crease angle amounts to 250° while the tear strength is reduced by 20%. By this finishing treatment, the fabric is also well flameproofed.

We claim:

1. In a process for creaseproofing a cellulosic textile material selected from the group consisting of natural and regenerated cellulose by applying to said material an aqueous solution containing a creaseproofing agent selected from the group consisting of precondensates of melamine and formaldehyde and the alkyl ethers of said precondensates, precondensates of urea and formaldehyde and the alkyl ethers of said precondensates, precondensates of epichlorohydrin and polyalcohols, and trisaziridinyl phosphine oxide, and subsequently subjecting said materials to dry curing, the improvement consisting of including in said aqueous solution a catalyst decomposable to yield an acid solution between 90° C. and 160° C. and selected from the group consisting of copolymers of vinyl acetate and vinyl phosphonic acid, polyvinyl phosphonic acid, copolymers of vinyl phosphonic acid and acrylic acid, and copolymers of vinyl-acetate and vinyl phosphonic acid monoalkyl esters, and the salts of said vinyl phosphonic acid compounds and dry curing said materials between 90° C. and 160° C.; thereby creaseproofing said cellulosic material without excessively diminishing the strength thereof.

2. A process as defined in claim 1 wherein the polymer contains from about 50 to 100 vinyl phosphonic acid molecular units per macromolecule.

3. A process as defined in claim 1 wherein the polymer contains from about 65 to 85 vinyl phosphonic acid molecular units per macromolecule.

4. A process as defined in claim 1 wherein the polymer is a copolymer of vinylacetate and vinyl phosphonic acid neutralized with ammonia.

5. A process as defined in claim 1 wherein the polymer is a copolymer of vinylacetate and vinyl phosphonic acid-monoethylester in the form of the ammonium salt.

6. A process as defined in claim 1 wherein the polymer is an ammonium polyvinyl phosphonate.

7. A process as defined in claim 1 wherein the polymer is an ammoniacal solution of a copolymer of vinyl phosphonic acid and acrylic acid.

References Cited by the Examiner

UNITED STATES PATENTS

| | | | |
|---|---|---|---|
| 2,137,465 | 11/1938 | Thackston | 8—116.3 |
| 2,730,427 | 1/1956 | Suen | 8—116 |
| 2,889,192 | 6/1959 | D'Adamo | 8—115.6 |
| 2,953,595 | 9/1960 | Rauhut. | |
| 2,993,746 | 7/1961 | Miles. | |
| 3,036,052 | 5/1962 | Bier. | |

FOREIGN PATENTS

| | | |
|---|---|---|
| 596,601 | 4/1960 | Canada. |
| 846,287 | 8/1960 | Great Britain. |

OTHER REFERENCES

Crease Resisting Fabrics, J. T. Marsh, Reinhold Pub. Co., N.Y., 1962, pp. 112–114.

Nuessele: Textile Research Journal, vol. 26, pp. 32–39, Jan. 19, 1956.

NORMAN G. TORCHIN, *Primary Examiner.*

MORRIS O. WOLK, NORMAN G. TORCHIN,
*Examiners.*